United States Patent [19]

Lowe

[11] Patent Number: 4,631,924
[45] Date of Patent: Dec. 30, 1986

[54] DUAL-CIRCUIT MASTER CYLINDER HAVING AUXILIARY PISTON AND YOKE WITH EQUALIZATION CHAMBERS FOR HYDRAULIC EQUALIZATION

[75] Inventor: Derek R. Lowe, Glashuetten, Fed. Rep. of Germany

[73] Assignee: ITT Industries, Inc., New York, N.Y.

[21] Appl. No.: 618,583

[22] Filed: Jun. 8, 1984

[30] Foreign Application Priority Data

Jun. 16, 1983 [DE] Fed. Rep. of Germany ....... 3321729

[51] Int. Cl.$^4$ ...................... B60T 11/20; B60T 11/28; F15B 3/00; F15B 7/08
[52] U.S. Cl. ........................................ 60/562; 60/579; 60/581; 60/589; 303/119
[58] Field of Search ................. 60/546, 555, 579, 562, 60/580, 581, 589; 92/174; 303/119, 113

[56] References Cited

U.S. PATENT DOCUMENTS

| | | | |
|---|---|---|---|
| 1,443,219 | 1/1923 | Frock | 60/580 |
| 2,067,697 | 1/1937 | Fontaine | 60/580 |
| 2,124,363 | 7/1938 | Bertrand | 60/580 |
| 2,762,199 | 9/1956 | Major | 60/580 |
| 3,040,534 | 6/1962 | Hager | 60/580 X |
| 3,157,034 | 11/1964 | Beavers | 60/580 X |
| 3,910,643 | 10/1975 | Kobashi et al. | 60/580 X |
| 4,015,881 | 4/1977 | Adachi | 60/581 X |
| 4,231,224 | 11/1980 | Edwards et al. | 60/581 |
| 4,464,899 | 8/1984 | Myers et al. | 60/581 X |

FOREIGN PATENT DOCUMENTS 849395  9/1960  United Kingdom ............... 60/547.1

*Primary Examiner*—Robert E. Garrett
*Assistant Examiner*—George Kapsalas
*Attorney, Agent, or Firm*—James B. Raden; Donald J. Breh

[57] ABSTRACT

A dual-circuit master cylinder having hydraulic equalization is disclosed including a casing having two parallel bores and elongated pistons defining two power chambers in the casing connected to wheel brakes, a yoke including two blind bores receiving extending portion of the pistons defining two equalization chambers, an auxiliary piston operatively connected to the yoke, and a brake actuating member defining an auxiliary chamber connected to a supply reservoir via a check valve for supplying equal pressurized fluid to the equalization chambers upon movement of the auxiliary piston and yoke to displace the power pistons.

6 Claims, 2 Drawing Figures

DUAL-CIRCUIT MASTER CYLINDER HAVING AUXILIARY PISTON AND YOKE WITH EQUALIZATION CHAMBERS FOR HYDRAULIC EQUALIZATION

BACKGROUND OF THE INVENTION

The invention relates to a dual-circuit master cylinder, in particular for hydraulic braking systems of automotive vehicles which includes two bores extending beside each other in a casing and which with the ends of a first and a second power piston form a first and a second power chamber linked to wheel brakes, which power pistons are actuatable by a power output member via a yoke interconnecting the two power pistons.

In a known dual-circuit master cylinder of the kind referred to above (German printed and published patent application No. 1655266), a power output member actuatable by a brake pedal acts on the yoke which in turn actuates the two power pistons. The yoke operates on the principle of a scale beam and by a tipping action balances different travels covered by the power pistons. This tipping action causes, however, a nonuniform distribution of power to the two power pistons so that different pressures occur in the power spaces associated with the power pistons. In the event of a failure of one of the two pressure medium circuits, a friction-type locking action occurs between the power output member, the yoke and the power piston. This locking action leads to considerable loss of efficiency, as well as an increase in the stroke of the yoke.

In this known dual-circuit master cylinder, the travel covered by the power output member equals that covered by the power pistons. The loss of travel due to the serial arrangement of the power pistons has its effect particularly in the operating range extending from the start of the actuation to the pressure rise in the power chambers associated with the individual wheel brakes. This increased travel loss before application of the brakes causes a reduction of the effective operating range at the brake pedal of a vehicle.

Another dual-circuit master cylinder (German patent specification No. 2460529) provides for a larger travel at the power piston for a given travel of the brake pedal. However, a reduction of the travel to be covered by the brake pedal is partially offset by the fact that the travels of the power pistons arranged one behind the other add up at the brake pedal. As a consequence, this dual-circuit master cylinder has a relatively large overall length.

SUMMARY OF THE INVENTION

A major object of the present invention is to provide for a dual-circuit master cylinder configured such that for a given pedal travel, a larger stroke is achieved at the power pistons. Thus, a uniform power distribution is attained in the braking system under its normal operating condition and an increase in the efficiency of the dual-circuit master cylinder is achieved.

According to the present invention, this object is achieved in that the dual-circuit master cylinder features an auxiliary piston-cylinder arrangement with an auxiliary chamber which in the release position of the power output member is connected to a supply tank by means of a duct. The duct is closable by a valve on actuation of the power output member by way of the auxiliary piston which is actuated by the power output member. The yoke together with one end of the first and of the second power piston forms a first and a second equalizing chamber which are connected to the auxiliary chamber by means of a duct. According to the invention, with the braking system in its normal condition, the auxiliary piston which is coupled with the power output member needs to more only a small distance so as to cause the two power pistons to be promptly forced to cover a larger travel. The volume of fluid being displaced out of the auxiliary chamber is thereby conveyed into the two equalizing chambers which are adjacent to the two power pistons as a result of which the power pistons move away more rapidly from the power output member, and on return approach it more rapidly. The transmission ratio is determined by the diameter of the auxiliary piston and by the diameters of the power chambers. Owing to their equalization of volumes, the interconnected equalizing chambers provide for a uniform pressure rise in the power chambers. Moreover, the dual-circuit master cylinder according to the present invention offers the advantage that an increase of the pressure in the operative power chamber is attained in the event of a failure of the other power chamber associated with wheel brakes. The power chambers arranged side by side advantageously lead to a short overall length of the dual-circuit master cylinder.

Advantageously, the auxiliary piston-cylinder arrangement is formed in the single casing of the dual-circuit master cylinder and the auxiliary piston is connected to the yoke and to the casing in a way ensuring flexural stiffness. By this provision, the yoke is being particulary well supported and guided. Owing to the comparatively long guide path of the auxiliary piston in the bore of the casing, the bending forces imposed on the auxiliary piston on a failure of one pressure circuit can be accommodated especially well. By also providing for elongated power pistons which extend a substantial distance into the respective bores in the casing and yoke, flexural stiffness of the cylinder is further ensured.

The connection of the equalizing chambers to the auxiliary chamber is advantageously achieved through that the connecting duct extends in the auxiliary piston and the yoke between the auxiliary chamber and the equalizing chambers.

Due to the configuration of the valve at the end of the auxiliary chamber, transmission of power between the power output member and the power piston is attained along the entire stroke of the dual-circuit master cylinder.

In a preferred embodiment of the invention the auxiliary piston-cylinder arrangement is formed in the yoke. In this version, the power transmission can be rendered ineffective in any operating condition of the dual-circuit master cylinder by means of a stop formed at the yoke, which stop limits the movement of the auxiliary piston in the direction of actuation. In this design, the stop may be arranged at the yoke in such a position that the auxiliary piston moves against the stop at the instant when the clearances existing in a braking system have been traversed so that during the pressure rise which then takes place, the power of the auxiliary piston will act directly on the power pistons. After a certain tuning, a dual-circuit master cylinder of that type may correspond to a filling-stage master cylinder known in brake technology. The filling procedure starts each time upon closure of the valve and terminates after striking of the power output member against the yoke.

The dual-circuit master cylinder according to the present invention is, in particular, suited also for a braking system equipped with an anti-locking device if one solenoid valve is provided in the duct between the auxiliary chamber and each equalizing chamber. Antilocking control is provided by these solenoid valves by controlling the valves to open and close in response to the instantaneous state of revolution of the wheel associated with the power chamber with which a particular solenoid valve is associated so as to control the pressure in the wheel brake, that is, in the event that a wheel brake is about to lock, the solenoid valve associated with the brake circuit leading to that particular wheel brake will open and cause a decrease in the pressure in the associated power chamber by draining off fluid before it reaches the equalization chamber for the affected brake circuit. As an alternative, such a control can be realized or be extended, in that the auxiliary chamber is connected to a controllable pressure source.

It is an advantage when the auxiliary and the equalizing chambers are located in an open system and the power chambers in a closed one instead. With this type of separation, the closed system which is associated with the wheel brakes may contain a long-life fluid, such as for example mineral oil or silicon brake fluid, which renders unnecessary any change of the brake fluid and at the same time prevents vapor locks leading to the failure of the braking system.

Advantageously, the pistons of one power chamber and of one equalizing chamber are connected to each other by a thrust member in order to prevent the manufacturing tolerances from leading to a slanted position of the yoke during assembly of the dual-circuit master cylinder.

BRIEF DESCRIPTION OF THE DRAWINGS

Several embodiments of the invention are illustrated in the drawings as follows.

DETAILED DESCRIPTION

Figure 1:
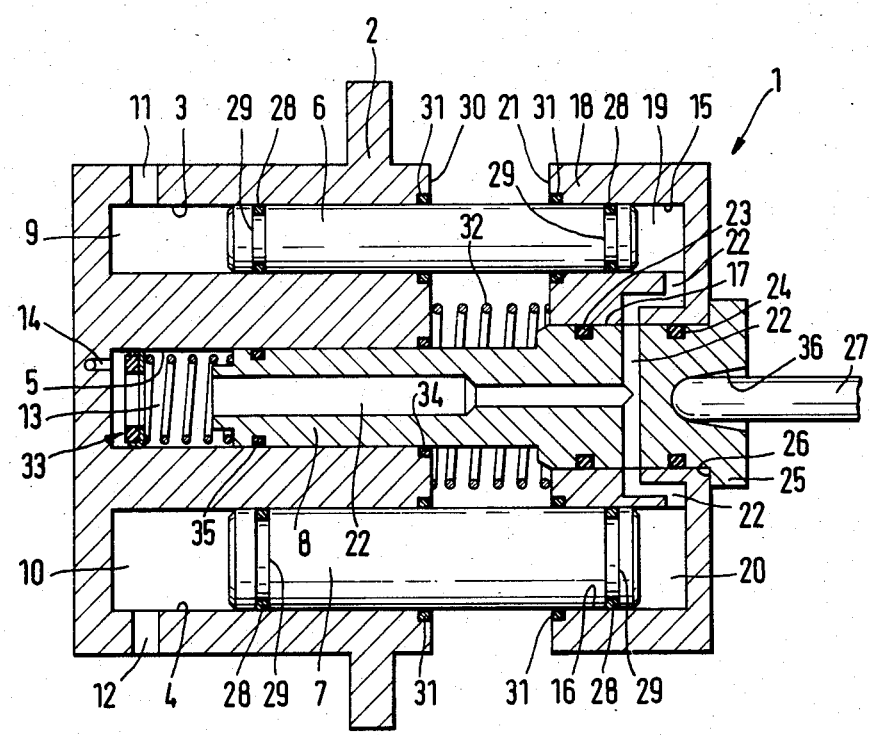
FIG. 1 is a diagrammatic sketch, in longitudinal cross-section, of a dual-circuit master cylinder showing details of construction.
Figure 2:
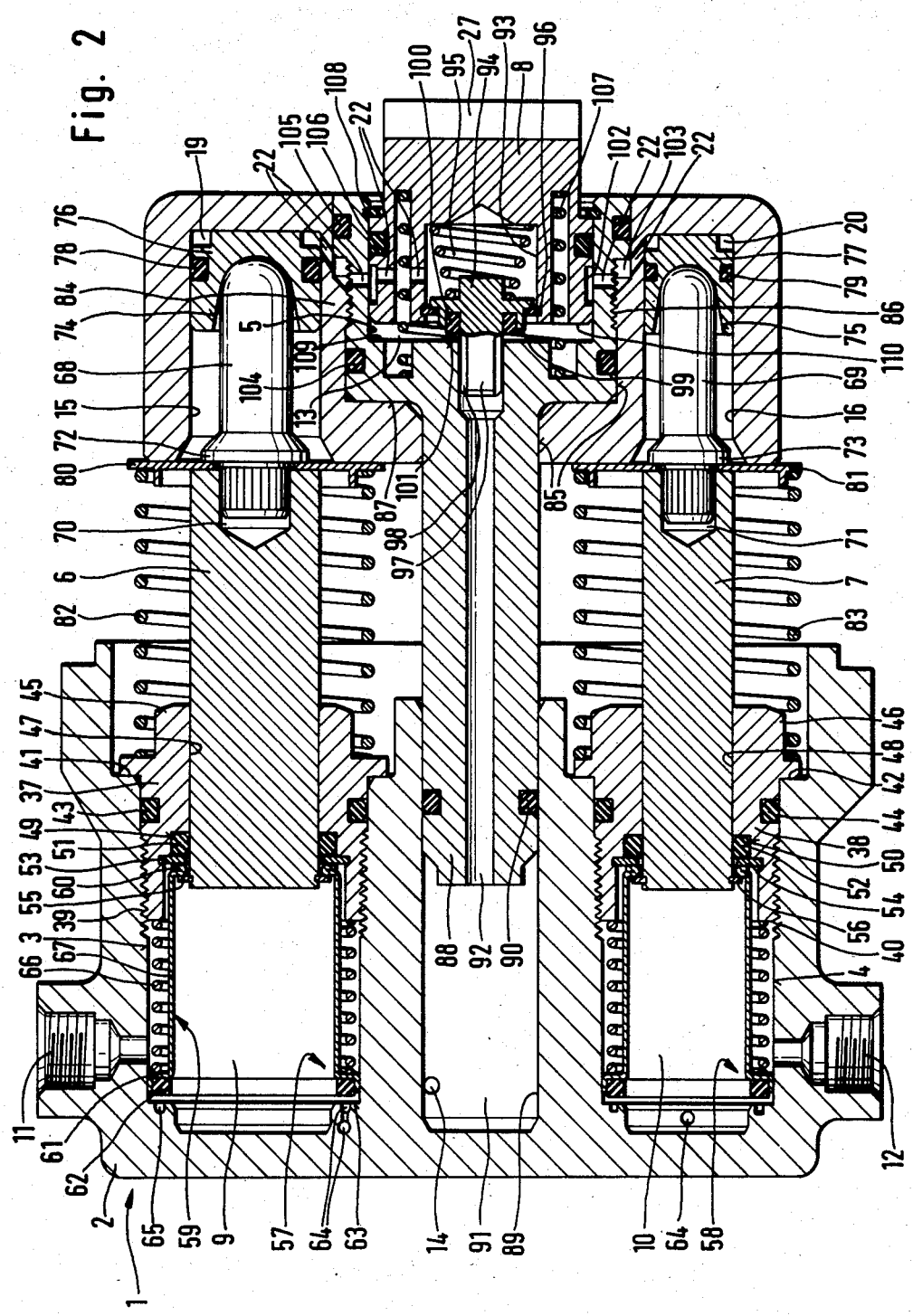
FIG. 2 is a longitudinal section through a further embodiment of a dual-circuit master cylinder showing details of construction.

In FIGS. 1 and 2 of the drawing, a dual-circuit master cylinder 1 is illustrated which includes a casing 2 and three bores 3, 4 and 5 extending parallel to one another. The bores 3 and 4 serve to receive the power pistons 6 and 7 while the bore 5 serves to accommodate the auxiliary piston 8. The power pistons 6 and 7 act on the power chambers 9 and 10 constituted by the bores 3 and 4. By means of respective pressure connections 11 and 12, each of the power chambers 9 and 10 is connected to wheel brakes of an automotive vehicle (not shown). The auxiliary piston 8 acts on the auxiliary chamber 13 formed by the bore 5. Via a connecting line 14, the auxiliary chamber 13 is connected with a reservoir filled with brake fluid (not shown).

As shown in FIG. 1, the power pistons 6 and 7 and the auxiliary piston 8 project from the bore 3, 4 and 5. The projecting ends of the pistons 6, 7 and 8 rest within respective bores 15, 16 and 17 to guide the yoke 18. The bores 15, and 16 are closed at their righthand ends as viewed in the drawing. These bores together with the power pistons 6 and 7 form respective equalizing chambers 19 and 20. A T-shaped duct 22 extends in the auxiliary piston 8 from the auxiliary chamber 13 in the longitudinal direction of the dual-circuit master cylinder and within the yoke 18 extends laterally to connect the reservoir 14 with the equalizing chambers 19 and 20. At the transition of the duct 22 from the auxiliary piston 8 into the yoke 18, the auxiliary piston 8 is sealed from the bore 17 on either side of the duct 22 by means of spaced annular seals 23 and 24. The auxiliary piston 8 penetrates through the yoke 18, and on the right end of the yoke 18 (viewing the drawing), the piston 8 terminates in the shape of the ring-shaped collar 25 which seats on the stop 26 of the yoke 18.

Through a power output member 27, the righthand end of the auxiliary piston 8 as viewed in the drawing is linked to a brake pedal of a vehicle (not shown).

In the dual-circuit master cylinder 1 illustrated in FIG. 1, the power pistons 6 and 7 comprise push rods which are provided at their axial ends with annular grooves 29 for accommodating separate sealing rings 28 to separate the power chambers 9 and 10 and the equalizing chambers 19 and 20 from the atmosphere in a pressure-tight manner. The bore for each power piston is discontinuous with bore 16 axially spaced from bore 4 and bore 15 spaced axially from bore 3. Adjacent the opening or discontinuity of the bores 3/15 and 4/16 spaced sealing rings 31 are secured in the casing 2 and in the yoke 18 to protect the bores against the penetration of moisture and dust. Between the lefthand end 21 of the yoke 18 and the righthand end 30 of the casing 2, a compression spring 32 is inserted with preload which urges the yoke 18 to the right as viewed in the drawing, i.e., the release direction.

A valve arrangement 33 is fastened at the end of the auxiliary piston 8 juxtaposed to the auxiliary chamber 13, which valve arrangement 33 seals off the connecting line 14 in a pressure-tight manner when the auxiliary piston 8 is actuated. The valve arrangement 33 is not described in greater detail in connection with this version, as the valve arrangement 33 corresponds in function to the valve arrangement 57, 58 in FIG. 2 and a detailed description is given in connection with the second version (FIG. 2).

The auxiliary piston 8 is sealed from the atmosphere by the sealing ring 34 and from the auxiliary chamber 13 by the annular seal 35. The power output member 27 is formed by a push rod which is supported in a swivel connection within a recess 36 open toward the outside (as shown).

In FIG. 2 of the drawing, the power pistons 6 and 7 are constituted by a plunger piston unit. Each plunger piston unit 6 and 7 comprises a sleeve 37 and 38 which by means of a thread 39 and 40 is firmly screwed into the respective bore 3 and 4 against a stop 41 and 42 formed at the casing 2 and is sealed by means of a seal 43 nd 44. The torque necessary for firm screwing is applied with the aid of a hexagon head 45/46 provided at the sleeve 37/38. Each sleeve 37/38 has a central bore 47/48 which serves to receive and guide the power pistons 6/7. At the transition of each bore 47/48 to the respective power chamber 9/10, each piston sealing ring 51/52 is provided in each of the annular grooves 49/50, which piston sealing ring 51/52 is held in its position by one each annular lip member 53/54 secured in the respectively sleeve 37/38. The movement of the respective power piston 6/7 is limited in the release direction of the dual-circuit master cylinder 1 by one each annular lip member 55/56 secured on the skirt of the power piston 6/7 which annular lip member 55/56 in its turn takes support in this position at the respective annular lip member 53/54 which is rigid with the casing 2. In each of the power chambers 9/10 a valve arrangement 57, 58 actuatable by the movement of the power pistons 6/7 is provided, which valve arrangement 57/58 closes the path to the pressure connections 11/12 on actuation of the dual-circuit master cylinder 1 and opens it in the latter's release position. Since both valve arrangements 57/58 are of like design, the description given hereunder is limited to the valve arrangement 57 in order to avoid repetition.

The valve arrangement 57 comprises a guide sleeve 59 with a substantially Z-shaped cross-section whose inwardly directed ring-shaped collar 60 is retained between the annular lip members 53 and 55 so that in the illustrated release position of the dual-circuit master cylinder 1, the annular seal 62 fastened to the radially external ring-shaped collar 61 at the other end of the guide sleeve 59 is positioned at a slight distance from the ring-shaped collar 61 of the duct 64 which connects the supply tank with the power chamber 9. In order to create a large sealing section for easier suction at the sealing face 63, sealing face 63 is formed by an axial groove 65 which is open toward the power piston 6. Between the sleeve 57 and the ring-shaped collar 61, a compression spring 66 is provided to ensure safe closure of the valve arrangement 57. This compression spring 66 concentrically surrounds the cylindrical portion 67 of the guide sleeve 59 and is extended and/or compressed by the guide sleeve 59 under the movement of the power piston 6.

The ends of the power pistons 6/7 projecting from the casing 2 are succeeded to the right as viewing the drawing by separate thrust members 68/69 whose cylindrical ends on the side of the pistons 6/7 are pressed into respective blind-end bores 70/71 of the power pistons 6/7 and take support at the front end of each power piston 6/7 by means of a ring-shaped collar 72/73. The thrust members 68/69 project into the bores 15/16 of the yoke 18 and are abutted, in a cap-shaped recess 74/75, against the respective pistons 76/77 applying pressure to the equalizing chambers 19/20. In an annular groove provided in their skirt the pistons 76/77 each bear one each piston sealing ring 78/79 abutting in a pressure-tight manner in the respective bore 15 and 16.

Due to the force fit between the thrust members 68/69 and the power pistons 6/7, the respective ring-shaped collars 72/73 press associated guide disks 80/81 against the end of the respective power piston 6/7. Each guide disk 80/81 is therefore positively locked with the respective power piston-thrust member arrangement. In the spacing between the yoke 18 and the casing 2, the power pistons 6/7 are surrounded by respective compression springs 82/83 which take support at the respective guide disks 80/81 and at the respective sleeves 37/38. The purpose of the compression springs 82/83 is to make the power pistons 6/7 with their respective annular lip member 55/56 strike on the pertaining annular lip member 53/54 rigid with the casing 2 and at the same time keep the respective valve arrangement 57/58 in its open position when the dual-circuit master cylinder 1 has adopted its release position. In essence, the dual-circuit master cylinder 1 as per FIG. 2 differs from that of FIG. 1 in that the auxiliary chamber 13 is formed in the yoke 18 and the auxiliary piston 8 does therefore not penetrate through the yoke 18. The auxiliary piston 8 is guided in the bore 5 of the intermediate sleeve 84 which in its turn is guided with its cylindrical circumferential surface in the step bore 85 formed in the yoke 18. The intermediate sleeve 84 is pressed into the step bore 85 and strikes against the yoke 18 at the offset step 87. The intermediate sleeve 84 is succeeded in the direction of the casing 2 by a cylindrical stem 88 which penetrates through the step bore 85 and projects into a blind-end bore 89 which is formed in the casing 2. A sealing ring 90 which is secured on the cylindrical stem 88 is tightly abutted with the wall of the blind-end bore 89. Together with the blind-end bore 89 the cylindrical stem 88 forms an intake space 91 which is associated via the connecting line 14 with a reservoir (not shown). A duct 92 extends in the cylindrical stem 88 and connects the intake space 91 with the auxiliary chamber 13. The length of the intake space 91 is adapted such that the maximum stroke of the dual-circuit master cylinder 1 can be covered. The intake space 91 is sealed off against the ambient surroundings in a pressure-tight manner by means of the sealing ring 90 and the cylindrical stem 88.

A blind-end bore 93 open toward the auxiliary chamber 13 has a valve plunger 94 mounted therein which in the direction of actuation of the dual-circuit master cylinder 1 is kept in abutment by a valve spring 95 taking support at the bottom of the blind-end bore 93, against the stop 96 located at and rigid with the auxiliary piston 8. The valve plunger 94 is provided with a guide stem 97 which itself is guided in the bore of the duct 92. Grooves 98 are axially formed on the surface of the guide stem 97 in order to make sure that brake fluid can be recovered through the duct 92 from the intake space 91 for flow to the auxiliary chamber 13. The guide stem 97 is succeeded within the auxiliary chamber 13 by a ring-shaped shoulder 99. A front surface of the shoulder faces the guide stem 97. A sealing ring 100 is secured to the front surface which together with the sealing seat 101 at the exit of the duct 92 forms the valve seat. The distance from the valve plunger 94 to the sealing seat 101 is exactly sized to ensure closure on the very least actuation of the auxiliary piston 8 which is in active connection with the power output member 27.

On account of the intermediate sleeve 84, the duct 22 radially outwardly penetrates the auxiliary piston 8 as well as the intermediate sleeve 84. On either side of the auxiliary chamber 13 in the range of the duct 22, the external circumferential surfaces of both the auxiliary piston 8 and the intermediate sleeve 84 are formed with separate annular grooves 102 and 103 respectively. In this way a hydraulic medium connection through the duct 22 is maintained even in the event of a distortion of these parts relative to each other. On both sides of the duct 22, separate sealing rings 104 and 105 are secured to the radially circumferential surface of the intermediate sleeve 84, which sealing rings 104 and 105 are applied to the step bore 85 in a pressure-tight manner and seal the duct from the atmosphere in this transition area. At its radially external skirt surface the auxiliary piston 8 bears the piston sealing ring 106 which is tightly applied to the surface of the bore 5 and seals the auxiliary chamber 13 from the atmosphere.

Radially outwardly of the valve plunger 94 a compression spring 107 takes support at the intermediate sleeve 84 and at the auxiliary piston 8. This compression spring 107 retains the auxiliary piston 8, in the direction opposed to that of actuation, abutted against a stop of the intermediate sleeve 84 being constituted by an annular lip member 108. In this position, the stop 109 limiting the movement of the auxiliary piston 8 in the direction of actuation of the dual-circuit master cylinder 1 is farthest away from the facing stop 110 of the auxiliary piston 8.

The mode of operation of the dual-circuit master cylinder of FIG. 1 according to the invention is as follows:

When the power output member 27 is actuated and moved to the left, the yoke 18 and the valve arrangement 33 are also moved to the left together with the auxiliary piston 8. Since the valve arrangement 33 requires but a very slight closing travel, a very slight brake pedal travel will be sufficient to shut off the connecting line 14 from the auxiliary chamber 13 in a pressure-tight manner. As the equalizing chambers 19/20 on the other hand form a closed system with the auxiliary chamber 13, a slight pressure will build up in this system. This pressure will move the power pistons 6/7 to the left as the power output member 27 continues its movement. Then according to the product of area multiplied by the travel covered by the auxiliary piston 8, a volume of brake fluid will at the same time be conveyed through the duct 22 from the auxiliary chamber 13 into the two equalizing chambers 19/20. In this way, the power pistons 6/7 are now moved to the left more rapidly relative to the movement of the yoke 18. A dual-circuit master cylinder 1 of this kind serves to reduce the brake pedal travel of an automotive vehicle in the presence of pre-established brake pedal dimensions.

Due to the movement of the power pistons 6/7 brake fluid will be conveyed from the power chambers 9/10 through the pressure connections 11/12 to the individual wheel brakes. As soon as the clearances of the brake circuits linked with the power chambers 9/10 are filled the pressure will increase further and braking of the vehicle will be initiated. If the volumetric absorption of the brake circuits associated with the power chambers 9/10 should, nevertheless, differ from each other, then that power piston which has already filled its clearances will remain at a standstill until the other power piston has arrived at that same level. This procedure is accelerated, in particular, by the fluid which is displaced from the auxiliary chamber 13 now being delivered into the respective equalizing chamber and the respective power piston being thereby accelerated to a certain additional extent in its forward movement. The different diameters of the power pistons 6/7 result from the dimensioning of the brakes of a particular motor vehicle. Notwithstanding, an equal pressure exists at both power chambers 9/10. During the release procedure, the dual-circuit master cylinder 1 operates in the inverse manner.

Alternatively, it is possible to connect the power chambers 9/10 in the release position of the dual-circuit master cylinder 1, with a reservoir filled with brake fluid via a valve arrangement, for example via the known breather bore. This would reduce still further the overall axial length of the dual-circuit master cylinder 1 since in that case the power pistons 6/7 would not have to move farther into the pertaining bores 3/4 due to the wear at the individual wheel brakes.

In the event of a failure of one brake circuit, the yoke 18 will with its bottoms formed in the bores 15/16 move against the end of the power pistons 6/7, and on continued actuation pressure will be built up in the sound brake circuit causing a pressure difference which imposes a bending moment on the yoke 18. The guide of the power and auxiliary pistons 6, 7 and 8 in the casing 2 must be dimensioned to be sturdy enough for the dual-circuit master cylinder 1 to undergo these stresses without damage.

On actuation of the dual-circuit master cylinder 1 according to FIG. 2, the auxiliary piston 8 will first shift until the valve plunger 94 is seated on the sealing seat 101 and the connection via the duct 92, the intake space 91 and the connecting line 14 to the supply tank (not shown) is prevented. On continued actuation of the auxiliary piston 8, the stop 110 will approach the stop 109. During this actuation, brake fluid will be conveyed from the auxiliary chamber 13 through the duct 22 into the two equalizing chambers 19/20 in accordance with the product of area multiplied by the travel covered by the auxiliary piston 8. As the effective area of the auxiliary piston 8 substantially exceeds the effective area of the power pistons 6/7, the power pistons 6/7 are moved forward relatively rapidly so that on the closure of the ducts 64 by the action of the respective valve arrangements 57/58 the wheel brakes coupled with the pressure connections 11/12 will also be applied relatively rapidly. This filling procedure ends when the stop 110 reaches at the stop 109.

As actuation of the dual-circuit master cylinder 1 is continued further, the auxiliary piston 8 will then shift the yoke 18 together with the intermediate sleeve 84. Since during the filling procedure the pistons 76 and 77 have moved away from the bottom of the respective bores 15/16, there is now existing a hydraulic pad formed by the equalizing chambers 19/20, which is transmitted to the pistons 76/77. The power pistons 6/7 are now subject to the same movement as the auxiliary piston 8 and the yoke 18. This arrangement offers the advantage of a large active area being utilized during the filling phase in order to attain the displacement of a large volume and a smaller active area in the working phase with the aim of achieving elevated hydraulic pressures. As actuation is continued still further a uniform pressure will then build up in the individual brake circuits, and the vehicle will start to brake under the effect of the clamping forces at the individual wheel brakes. The yoke 18 which in addition functions in the mode of the scale beam which assures that an equal pressure is brought to act on the power pistons 6/7 at all times.

During the release procedure, the dual-circuit master cylinder 1 operates in the inverse manner. A short length before its end position the power pistons 6/7 move the valve arrangements 57/58 in the direction of release of the dual-circuit master cylinder 1 and open up the ducts 64. If a slight vacuum should have been generated in the power chambers 9/10 already beforehand, then the valve arrangements 57/58 will lift spontaneously so that even before opening, brake fluid may be recovered from the supply tank for flow into the power chambers 9/10.

In the event of failure of one brake circuit, the auxiliary piston 8 will move up to the stop 109. The volume thereby displaced is conveyed from the auxiliary chamber to that equalizing chamber 19 or 20 which is related to the defective brake circuit. The respective power piston 6 or 7 will travel to the left as viewing the drawing.

During further actuation of the dual-circuit master cylinder 1, the auxiliary piston 8, the intermediate sleeve 84, the yoke 18, and the piston 76 or 77 associated with the operatively sound brake circuit are positively locked to one another, and the relevant power piston 6 or 7 will move in the actuating direction of the dual-circuit master cylinder 1 as a result of which the total power available at the power output member 27 is available for the operatively sound brake circuit. In this arrangement, the cylindrical stem 88 will have to accommodate and transmit to the casing 2 the bending moment occurring in the event of a failure of one brake circuit. The thrust members 68/69 are retained in swivel connections in cap-shaped recesses 74/75 of the pistons 76/77 in order to achieve perfect centering of the yoke 18 relative to the casing 2 via the cylindrical stem 88.

What is claimed is:

1. A dual-circuit master cylinder for use in a hydraulic brake system of an automotive vehicle comprising:
    a casing including three parallel bores, each closed on one end, two of said bores each including an outlet pressure connection communicating therewith proximate said closed ends, a third of said bores including an inlet duct communicating therewith at said closed end;
    a normally open check valve associated with said duct;
    two power pistons, each slidably received in a respective one of said two bores defining two power chambers, each of said power pistons having a portion thereof extending from said respective bore externally of said casing;
    an auxiliary piston slidably received in said third bore defining an auxiliary chamber and having a portion thereof extending from said third bore externally of said casing and including means for being operatively connected to a brake actuator of said brake system;
    a yoke affixed coaxially to said auxiliary piston for axial movement therewith at a position along the external portion of said auxiliary piston such that said yoke is axially spaced apart from said casing, said yoke including two cylindrical bores, each coaxially aligned with a respective one of said two bores in said casing and having a closed end and an open end said open end facing said casing;
    the portion of each of said two pistons extending from said respective bore of said casing being slidably received in a respective one of said two cylindrical bores in said yoke defining two equalizing chambers in said yoke; and
    a passage in said auxiliary piston and said yoke connecting said auxiliary chamber to each of said two equalizing chambers.

2. A dual circuit master cylinder as claimed in claim 1, in which each of said pistons includes a thrust member on the portion thereof extending from said respective bore externally of said casing, each said thrust member extending into a respective one of said two equalizing chambers.

3. The dual master cylinder as defined in claim 1, further comprising means for biasing said yoke and said casing in said axially spaced apart relationship including a compression spring supported on one end by said casing and on a second end by said spaced apart yoke.

4. The dual-master cylinder as defined in claim 1, wherein said yoke includes a through-bore coaxial with said third bore in said casing;
    said external portion of said auxiliary piston is received in said through-bore.

5. The dual-master cylinder as defined in claim 4, wherein said auxiliary piston includes a collar on an end thereof received against a stop surface on said yoke.

6. The dual master cylinder as defined in claim 1, wherein said passage connecting said auxiliary chamber to each of said two equalizing chambers includes a first duct having one portion extending from said auxiliary chamber axially into said auxiliary piston and a second portion connecting with said first portion, said second portion of said first duct connecting to a pair of second ducts in said yoke, each of said pair of second ducts connecting to a respective one of said two equalizing chambers.

* * * * *